United States Patent
Yoon

(10) Patent No.: US 10,064,128 B2
(45) Date of Patent: Aug. 28, 2018

(54) METHOD AND APPARATUS FOR PERFORMING PRIORITY BASED CELL RESELECTION

(71) Applicant: Samsung Electronics Co., Ltd., Suwon-si, Gyeonggi-do (KR)

(72) Inventor: Seungil Yoon, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/862,623

(22) Filed: Sep. 23, 2015

(65) Prior Publication Data

US 2016/0088529 A1    Mar. 24, 2016

Related U.S. Application Data

(60) Provisional application No. 62/054,567, filed on Sep. 24, 2014.

(30) Foreign Application Priority Data

Jan. 27, 2015  (KR) ......................... 10-2015-0012673

(51) Int. Cl.
*H04W 36/04* (2009.01)
*H04W 48/18* (2009.01)
(Continued)

(52) U.S. Cl.
CPC ........ *H04W 48/18* (2013.01); *H04W 36/0061* (2013.01); *H04W 36/0083* (2013.01);
(Continued)

(58) Field of Classification Search
CPC .................. H04W 36/04; H04W 74/0833; H04J 11/0093
See application file for complete search history.

(56) References Cited

U.S. PATENT DOCUMENTS

| 2009/0181676 A1* | 7/2009 | Lee | ............ H04J 11/0093 455/436 |
| 2010/0093356 A1* | 4/2010 | Lee | ............ H04W 4/20 455/437 |

(Continued)

FOREIGN PATENT DOCUMENTS

WO    2014-021611 A1    2/2014

OTHER PUBLICATIONS

Nokia Corporation et al.: "Prioritisation in UTRAN-LTE interworking", R2-075063, Prioritisation in UTRAN-LTE Interworking, vol. RAN WG@, no. Jeju, South Korea; Nov. 5, 2007-Nov. 9, 2007, Nov. 12, 2007, XP050603384.*

(Continued)

*Primary Examiner* — Myron K Wyche
(74) *Attorney, Agent, or Firm* — Jefferson IP Law, LLP

(57) ABSTRACT

A method and an apparatus for priority based inter-radio access technology (inter-RAT) cell reselection are provided. In the existing algorithm for priority based inter-RAT cell reselection, an inter-RAT cell whose signal strength is above a preset threshold for a given duration is considered as satisfying the cell reselection criteria and may become a candidate for cell reselection. In this case, among those cells whose signal strength is above the preset threshold, a cell that does not have the highest priority may be selected. To address the above problem, the reference time duration for cell reselection may be changed. The enhanced cell reselection algorithm selects a cell having the highest priority among cells whose signal strength is above a preset threshold. Hence, it is possible to prevent repetition of unnecessary cell reselection.

22 Claims, 14 Drawing Sheets

(51) Int. Cl.
   *H04W 36/00* (2009.01)
   *H04W 36/14* (2009.01)
   *H04W 48/20* (2009.01)
   *H04W 88/06* (2009.01)

(52) U.S. Cl.
   CPC ............ *H04W 36/14* (2013.01); *H04W 48/20* (2013.01); *H04W 88/06* (2013.01)

(56) References Cited

U.S. PATENT DOCUMENTS

| | | |
|---|---|---|
| 2012/0322447 A1 | 12/2012 | Ramachandran et al. |
| 2014/0011500 A1 | 1/2014 | Jokinen et al. |
| 2014/0066067 A1 | 3/2014 | Karri |
| 2014/0162646 A1* | 6/2014 | Lee .................. H04W 74/0833 455/435.2 |
| 2014/0242993 A1 | 8/2014 | Dahlen et al. |

OTHER PUBLICATIONS

Nokia Corporation, Prioritisation in UTRAN-LTE Interworking, 3GPP TSG-RAN WG2 Meeting #60, Nov. 5-9, 2007, R2-075063, Jeju, South Korea.

Nokia et al., Text Proposal for Mobility Requirements for E-UTRA to UTRA, 3GPP TSG-RAN WG4 Meeting #45, Nov. 5-9, 2007, R4-071834, Jeju, Korea.

Panasonic et al., Priority based reselection to UTRAN, 3GPP TSG GERAN Meeting #43, Aug. 31-Sep. 4, 2009, GP-091160, Vancouver, Canada.

European Search Report dated Aug. 4, 2017, issued in the European Patent Application No. 15843764.0.

* cited by examiner

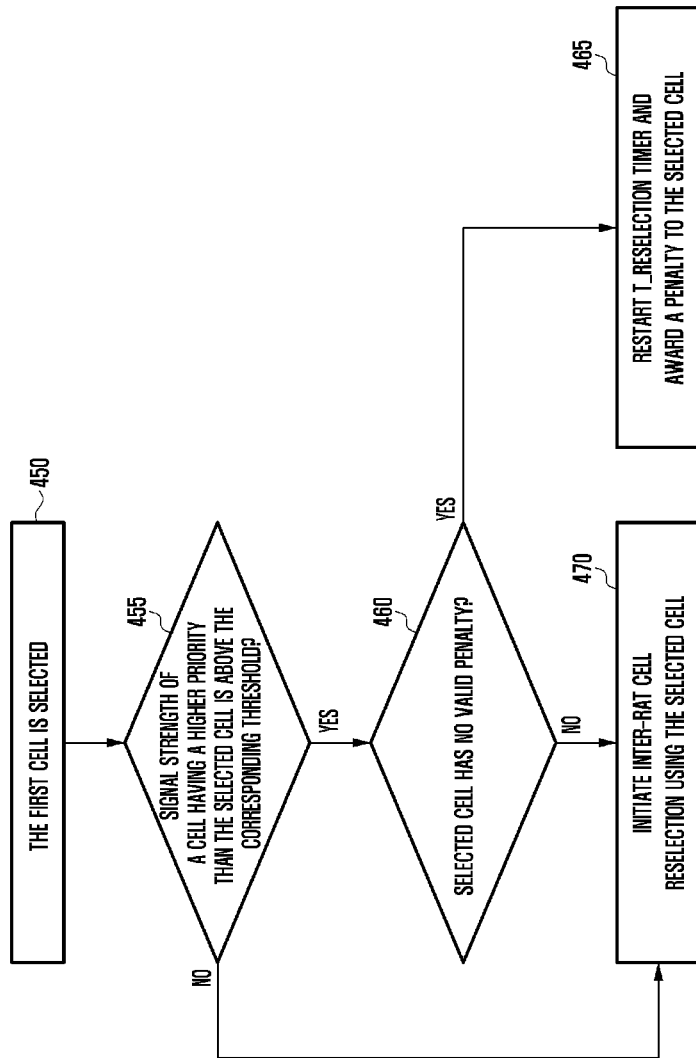

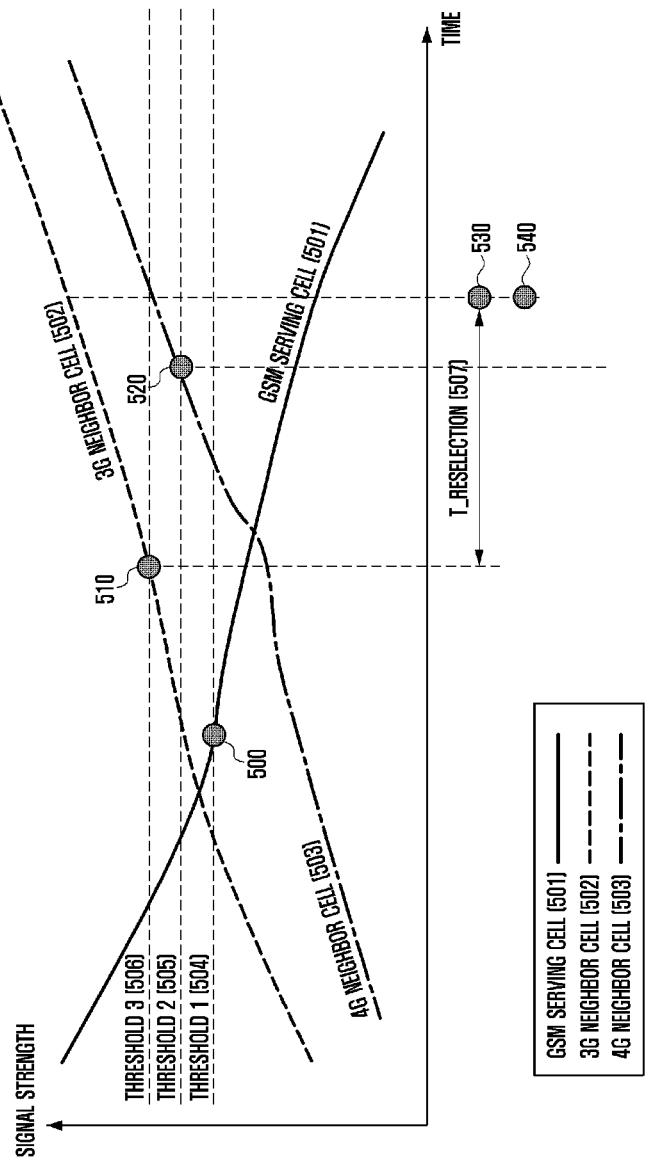

METHOD AND APPARATUS FOR PERFORMING PRIORITY BASED CELL RESELECTION

CROSS-REFERENCE TO RELATED APPLICATION(S)

This application claims the benefit under 35 U.S.C. §119(e) of a U.S. Provisional application filed on Sep. 24, 2014 in the U.S. Patent and Trademark Office and assigned Ser. No. 62/054,567, and under 35 U.S.C. §119(a) of a Korean patent application filed on Jan. 27, 2015 in the Korean Intellectual Property Office and assigned Serial number 10-2015-0012673, the entire disclosure of each of which is hereby incorporated by reference.

TECHNICAL FIELD

The present disclosure relates to inter-radio access technology (inter-RAT) cell reselection based on priority information. More particularly, the present disclosure relates to a method and apparatus for inter-RAT cell reselection ensuring selection of a cell with the highest priority.

BACKGROUND

In the algorithm for priority-based cell reselection described in $3^{rd}$ generation partnership project (3GPP) technical specification (TS) 45.008, when a user equipment (UE) camping on a global system for mobile communications ((GSM), $2^{nd}$ generation (2G)) serving cell performs cell reselection to a universal terrestrial radio access network ((UTRAN), 3G) or evolved UTRAN ((E-UTRAN), 3.9G or $4^{th}$ generation (4G)) neighbor cell through inter-radio access technology (inter-RAT) cell reselection, the UE is to reselect the highest priority cell among multiple inter-RAT cells.

According to the above algorithm, an inter-RAT cell whose signal strength is above a preset threshold for a given duration is considered as satisfying the cell reselection criteria and may become a candidate for cell reselection. In this case, among those cells whose signal strength is above the preset threshold, a cell that does not have the highest priority may be selected.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and apparatus for inter-radio access technology (inter-RAT) cell reselection that ensure selection of a cell having the highest priority.

In accordance with an aspect of the present disclosure, a method for performing priority based inter-RAT cell reselection by a user equipment in a wireless communication system is provided. The method includes checking, when signal strength of a serving cell becomes less than a preset threshold of a radio access technology (RAT) associated with the serving cell, presence of a candidate cell meeting a first condition, the first condition being a condition where signal strength of the candidate cell is greater than a preset threshold of a RAT associated with the candidate cell for a time duration T_Reselection, selecting a highest priority cell as a first cell among candidate cells satisfying the first condition for the time duration T_Reselection, and checking, after selecting the first cell, presence of a second cell whose priority is higher than that of the first cell and whose signal strength is greater than a preset threshold of a RAT associated with the second cell.

In accordance with another aspect of the present disclosure, a user equipment capable of performing priority based inter-RAT cell reselection in a wireless communication system is provided. The user equipment includes a transceiver unit configured to send and receive signals, and a control unit configured to check, when signal strength of a serving cell becomes less than a preset threshold of a RAT associated with the serving cell, presence of a candidate cell meeting a first condition, the first condition being a condition where signal strength of the candidate cell is greater than a preset threshold of a RAT associated with the candidate cell for a time duration T_Reselection, select a highest priority cell as a first cell among candidate cells satisfying the first condition for the time duration T_Reselection, and check, after selecting the first cell, presence of a second cell whose priority is higher than that of the first cell and whose signal strength is greater than a preset threshold of a RAT associated with the second cell.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 4C is a flowchart describing the difference between the existing algorithm and the enhanced algorithm according to the first embodiment of the present disclosure;

FIG. 5 depicts the behavior of an enhanced algorithm for priority based cell reselection according to a second embodiment of the present disclosure;

Throughout the drawings, like reference numerals will be understood to refer to like parts, components, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The following description of various embodiments of the present disclosure is focused on the $3^{rd}$ generation partnership project (3GPP) global system for mobile communications (GSM) standards. However, it should be understood by those skilled in the art that the subject matter of the present disclosure is applicable to other communication systems having similar technical backgrounds and channel configurations without significant modifications departing from the scope of the present disclosure.

Figure 1A:
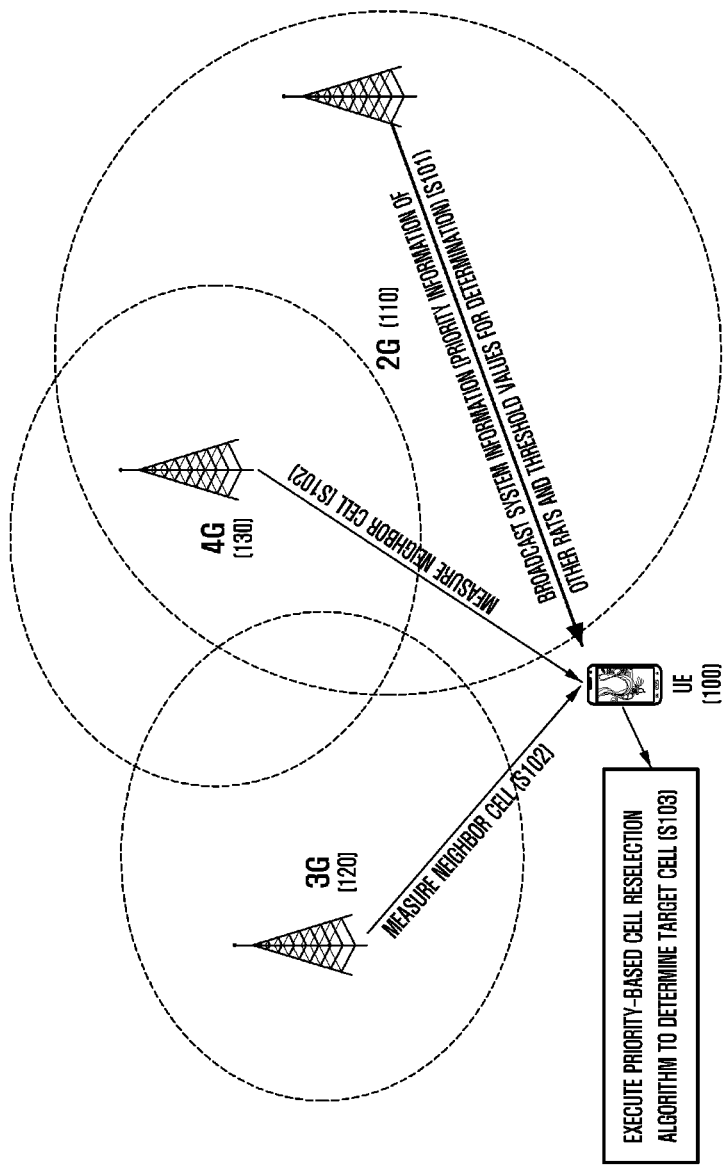
FIG. 1A illustrates a situation where a user equipment (UE) performs cell reselection among neighbor cells according to an embodiment of the present disclosure.

FIG. 1A illustrates a situation where a user equipment (UE) performs cell reselection among neighbor cells according to an embodiment of the present disclosure.

Referring to FIG. 1A, the UE 100 camps on a $2^{nd}$ Generation (2G) GSM cell 110. The term "camping" refers to a state where a UE is registered in a specific cell of a communication network, receives synchronization signals, system information, and reference signals from the cell, and is ready to communicate with the cell. The UE 100 obtains priority information of other radio access technologies (RATs) and threshold values for determination from system information broadcast by the GSM cell 110 at operation S101. The UE 100 measures the signal strength of a 3G universal terrestrial radio access network (UTRAN) cell 120 and a $4^{th}$ generation (4G) evolved UTRAN (E-UTRAN) cell 130 in the vicinity thereof at operation S102. Thereafter, to determine the target cell, the UE 100 initiates the priority based cell reselection algorithm at operation S103.

Figure 1B:
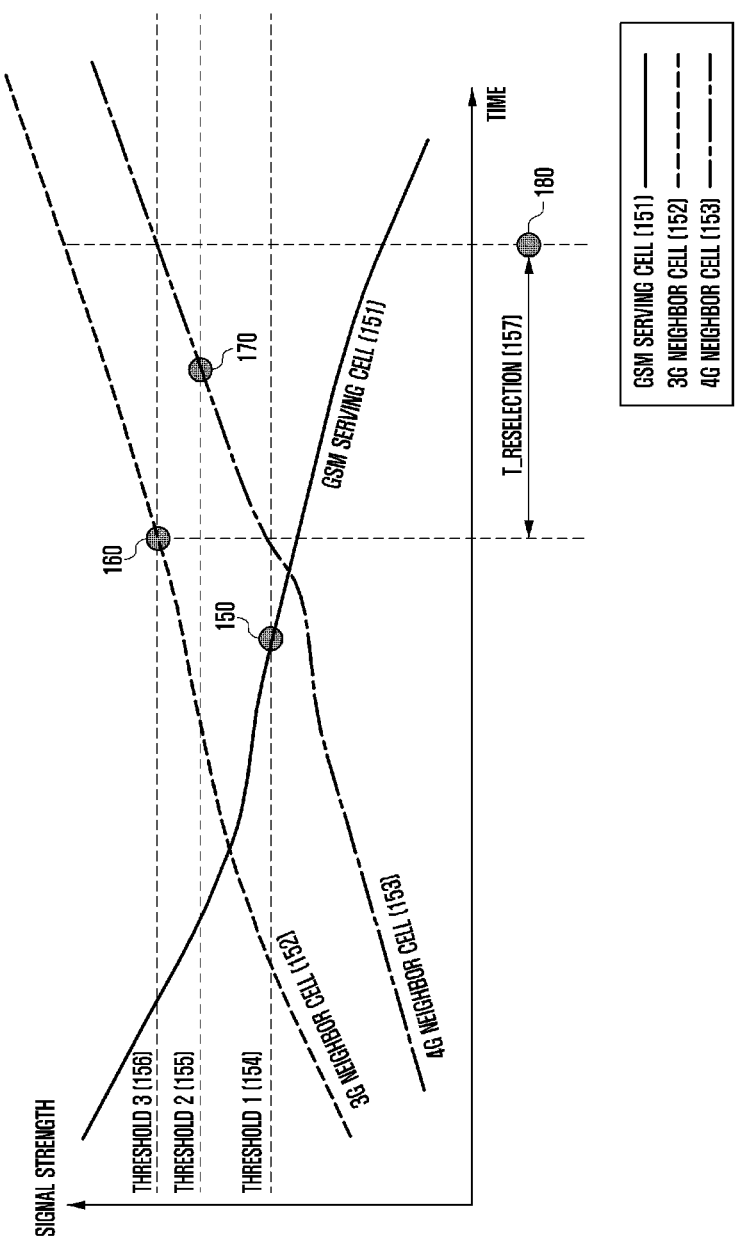
FIG. 1B depicts the behavior of the existing algorithm for priority based cell reselection according to an embodiment of the present disclosure.

FIG. 1B depicts the behavior of the existing algorithm for priority based cell reselection according to an embodiment of the present disclosure.

Referring to FIG. 1B, signal strengths of GSM serving cell 151, 3G neighbor cell 152, and 4G neighbor cell 153 are displayed with the passage of time. The signal strengths of the GSM serving cell, the 3G neighbor cell and the 4G neighbor cell are indicated by a solid line, broken line, and alternate long and short dash line, respectively. Here, it is assumed that the 4G communication network takes precedence over the 3G communication network.

Threshold 1 154 is associated with the GSM serving cell. When the signal strength of the GSM serving cell (GSM RxLev) becomes less than threshold 1 154, the UE may start to find a target cell for cell reselection. Threshold 2 155 is associated with a 4G neighbor cell. When the signal strength of a 4G neighbor cell (reference signal received power (RSRP)) becomes greater than threshold 2 155, the 4G neighbor cell may be recognized by the UE. Further, when the signal strength thereof is maintained above threshold 2 155 for a given duration, the 4G neighbor cell may become a candidate for cell reselection. Threshold 3 156 is associated with a 3G neighbor cell. When the signal strength of a 3G neighbor cell (received signal code power (RSCP)) becomes greater than threshold 3 156, the 3G neighbor cell may be recognized by the UE. Further, when the signal strength thereof is maintained above threshold 3 156 for a given duration, the 3G neighbor cell may become a candidate for cell reselection. T_Reselection_157 is a reference time duration. When the signal strength of a neighbor cell is maintained above the corresponding threshold for a time duration T_Reselection, the UE may select the neighbor cell.

When the signal strength of the GSM serving cell becomes less than threshold 1 154, the UE starts to find a target cell for cell reselection at operation 150. When the signal strength of a 3G neighbor cell becomes greater than threshold 3 156, the UE recognizes the 3G neighbor cell and adds the 3G neighbor cell to a candidate list for cell reselection at operation 160. When the signal strength of a 4G neighbor cell becomes greater than threshold 2 155, the UE recognizes the 4G neighbor cell and adds the 4G neighbor cell to the candidate list for cell reselection at operation 170. Here, when the signal strength of the 3G neighbor cell is maintained above threshold 3 156 for a time duration T_Reselection, the UE selects the 3G neighbor cell as a target for cell reselection and camps on the target cell of the 3G communication network at operation 180. However, after camping on the 3G communication network, when the signal strength of the 4G neighbor cell is also maintained above threshold 2 155 for a time duration T_Reselection, the UE may have to reselect the 4G neighbor cell having the higher priority. That is, the UE may have to perform unnecessary activities including selection of a 3G neighbor cell and then selection of a 4G neighbor cell. To address this problem, it is necessary to develop an enhanced priority based inter-RAT cell reselection algorithm enabling direct reselection from the GSM serving cell toward a 4G neighbor cell.

Figure 2A:
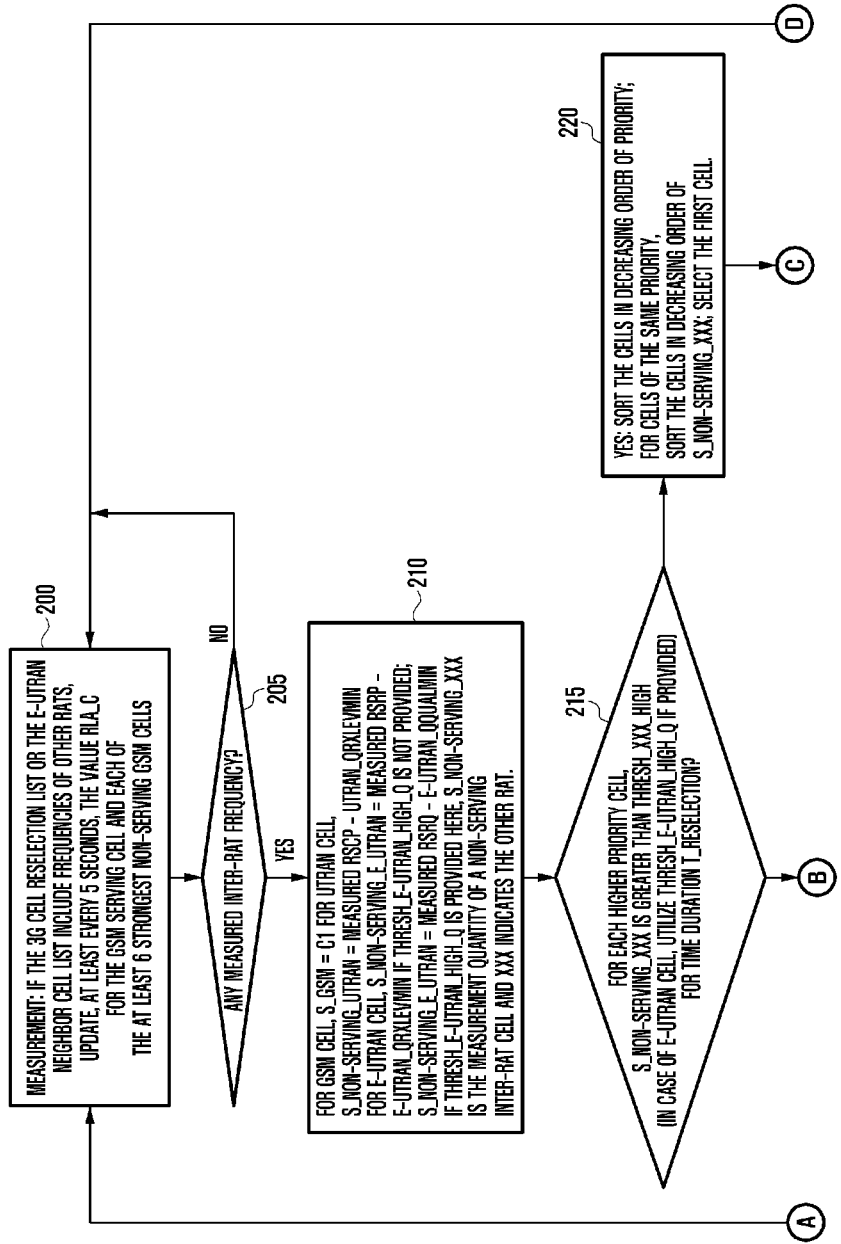
FIGS. 2A and 2B are flowcharts describing the existing algorithm for priority based cell reselection according to various embodiments of the present disclosure.
Figure 2B:
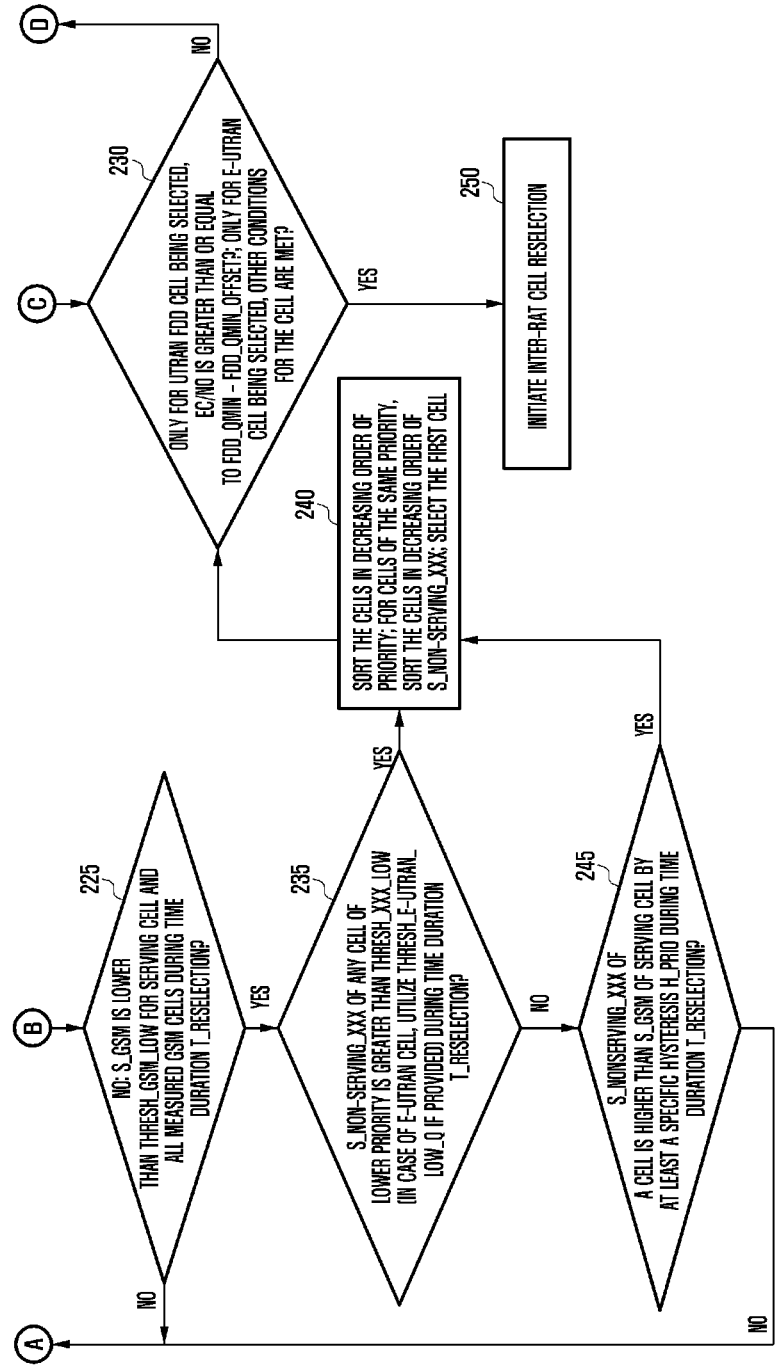

FIGS. 2A and 2B are flowcharts describing the existing algorithm for priority based cell reselection according to various embodiments of the present disclosure.

Referring to FIGS. 2A and 2B, at operation 200, if the 3G Cell Reselection list or the E-UTRAN Neighbor Cell list include frequencies of other RATs, the UE should at least every 5 seconds update the value RLA_C for the GSM serving cell and each of the at least 6 strongest non-serving GSM cells. If any measured inter-RAT frequency is present at operation 205, the procedure proceeds to operation 210.

Here, S_non-serving_XXX is the measurement quantity of a non-serving inter-RAT cell and XXX indicates the other RAT.

S_non-serving_XXX is defined as follows.

For a UTRAN cell, S_non-serving_UTRAN=measured RSCP-UTRAN_QRXLEVMIN. QRXLEVMIN indicates the minimum required reception level (dBm) in the cell.

For an E-UTRAN cell, S_non-serving_E_UTRAN=measured RSRP-E-UTRAN_QRXLEVMIN if THRESH_E-UTRAN_high_Q is not provided; and S_non-serving_E_UTRAN=measured reference signal received quality (RSRQ)-E-UTRAN_QQUALMIN if THRESH_E-UTRAN_high_Q is provided. QQUALMIN indicates the minimum required quality value (RSRQ) in the cell.

For a GSM cell, S_GSM=C1.

At operation 215, for each higher priority cell, the UE checks whether S_non-serving_XXX is greater than THRESH_XXX_high (in the case of a E-UTRAN cell, utilize THRESH_E-UTRAN_high_Q if provided) during a time duration T_Reselection.

If one or more cells satisfy the condition of operation 215, at operation 220, the UE sorts the cells in decreasing order of priority; for cells of the same priority, the UE sorts the cells in decreasing order of S_non-serving_XXX; and the UE selects the first cell. If no cell satisfies the condition of operation 215, at operation 225, the UE checks whether the value of S_GSM is lower than THRESH_GSM_low for the serving cell and all measured GSM cells during a time duration T_Reselection. If the condition of operation 225 is satisfied, at operation 235, the UE checks whether S_non-serving_XXX of an inter-RAT cell is greater than THRESH_XXX_low (in the case of an E-UTRAN cell, utilize THRESH_E-UTRAN_low_Q if provided) during a time duration T_reselection. If the condition of operation 225 is not satisfied, the procedure returns to operation 200 at which the UE continues measurement. If one or more cells satisfy the condition of operation 235, at operation 240, the UE sorts the cells in decreasing order of priority; for cells of the same priority, the UE sorts the cells in decreasing order of S_non-serving_XXX; and the UE selects the first cell. If no cell satisfies the condition of operation 235, at operation 245, the UE checks whether S_nonserving_XXX of an inter-RAT cell is higher than S_GSM of the serving cell by at least a specific hysteresis H_PRIO during a time duration T_Reselection. If one or more cells satisfy the condition of operation 245, at operation 240, the UE sorts the cells in decreasing order of priority; for cells of the same priority, the UE sorts the cells in decreasing order of S_non-serving_XXX; and the UE selects the first cell. If the condition of operation 245 is not satisfied, the procedure returns to operation 200 at which the UE continues measurement.

If the first cell is selected at operation 220 or at operation 240, at operation 230, the UE checks whether the selected cell is a UTRAN frequency division duplex (FDD) cell and its measured Ec/No value is greater than or equal to FDD_Qmin-FDD_Qmin_Offset; or the UE checks whether the selected cell is a E-UTRAN cell and other conditions for the cell are met. If the selected cell satisfies the condition of operation 230, at operation 250, the UE initiates inter-RAT cell reselection.

To address the problem of the existing priority based cell reselection algorithm, a new priority based cell reselection algorithm is provided below.

Figure 3:
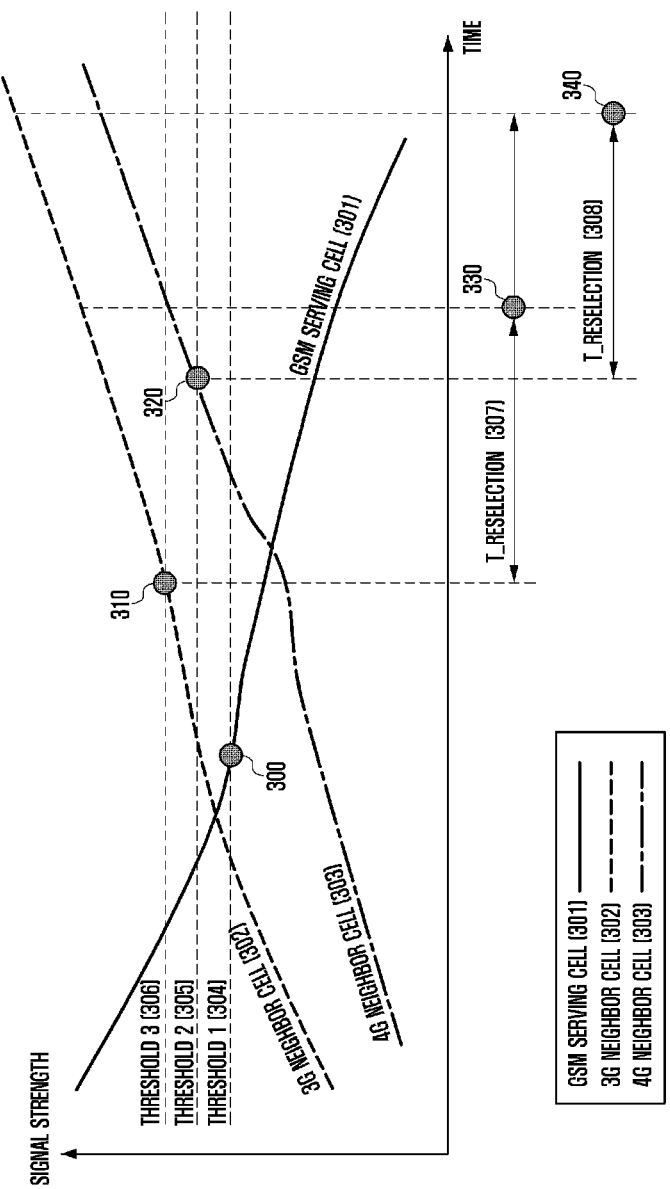
FIG. 3 depicts the behavior of an enhanced algorithm for priority based cell reselection according to a first embodiment of the present disclosure.

FIG. 3 depicts the behavior of an enhanced algorithm for priority based cell reselection according to a first embodiment of the present disclosure.

Referring to FIG. 3, signal strengths of GSM serving cell 301, 3G neighbor cell 302, and 4G neighbor cell 303 are displayed with the passage of time. The signal strengths of the GSM serving cell, the 3G neighbor cell and the 4G neighbor cell are indicated by a solid line, broken line, and alternate long and short dash line, respectively. Here, it is assumed that the 4G communication network takes precedence over the 3G communication network.

Threshold 1 304 is associated with the GSM serving cell. When the signal strength of the GSM serving cell (GSM RxLev) becomes less than threshold 1 304, the UE may start to find a target cell for cell reselection. Threshold 2 305 is associated with a 4G neighbor cell. When the signal strength of a 4G neighbor cell (RSRP) becomes greater than threshold 2 305, the 4G neighbor cell may be recognized by the UE. Further, when the signal strength thereof is maintained above threshold 2 305 for a given duration, the 4G neighbor cell may become a candidate for cell reselection. Threshold 3 306 is associated with a 3G neighbor cell. When the signal strength of a 3G neighbor cell (RSCP) becomes greater than threshold 3 306, the 3G neighbor cell may be recognized by the UE. Further, when the signal strength thereof is maintained above threshold 3 306 for a given duration, the 3G neighbor cell may become a candidate for cell reselection. T_Reselection 307 is a reference time duration. When the signal strength of a neighbor cell is maintained above the corresponding threshold for a time duration T_Reselection, the UE may select the neighbor cell.

When the signal strength of the GSM serving cell becomes less than threshold 1 304, the UE starts to find a target cell for cell reselection at operation 300. When the signal strength of a 3G neighbor cell becomes greater than threshold 3 306, the UE recognizes the 3G neighbor cell and adds the 3G neighbor cell to a candidate list for cell reselection at operation 310. When the signal strength of a 4G neighbor cell becomes greater than threshold 2 305, the UE recognizes the 4G neighbor cell and adds the 4G neighbor cell to the candidate list for cell reselection at operation 320. Here, when the signal strength of the 3G neighbor cell is maintained above threshold 3 306 for a time duration T_Reselection, the UE checks presence of an inter-RAT cell whose priority is higher than that of the 3G neighbor cell and whose signal strength is above the corresponding threshold (the 4G neighbor cell satisfies this condition in FIG. 3). If such a cell is present, the UE extends T_Reselection before expiration thereof at operation 330. During the extended period of T_Reselection 308 for the 3G neighbor cell, when the signal strength of the 4G neighbor cell is maintained above threshold 2 305 for a time duration T_Reselection, the UE selects the 4G neighbor cell, whose priority is higher than that of the 3G neighbor cell, and initiates inter-RAT cell reselection at operation 340.

Figure 4A:
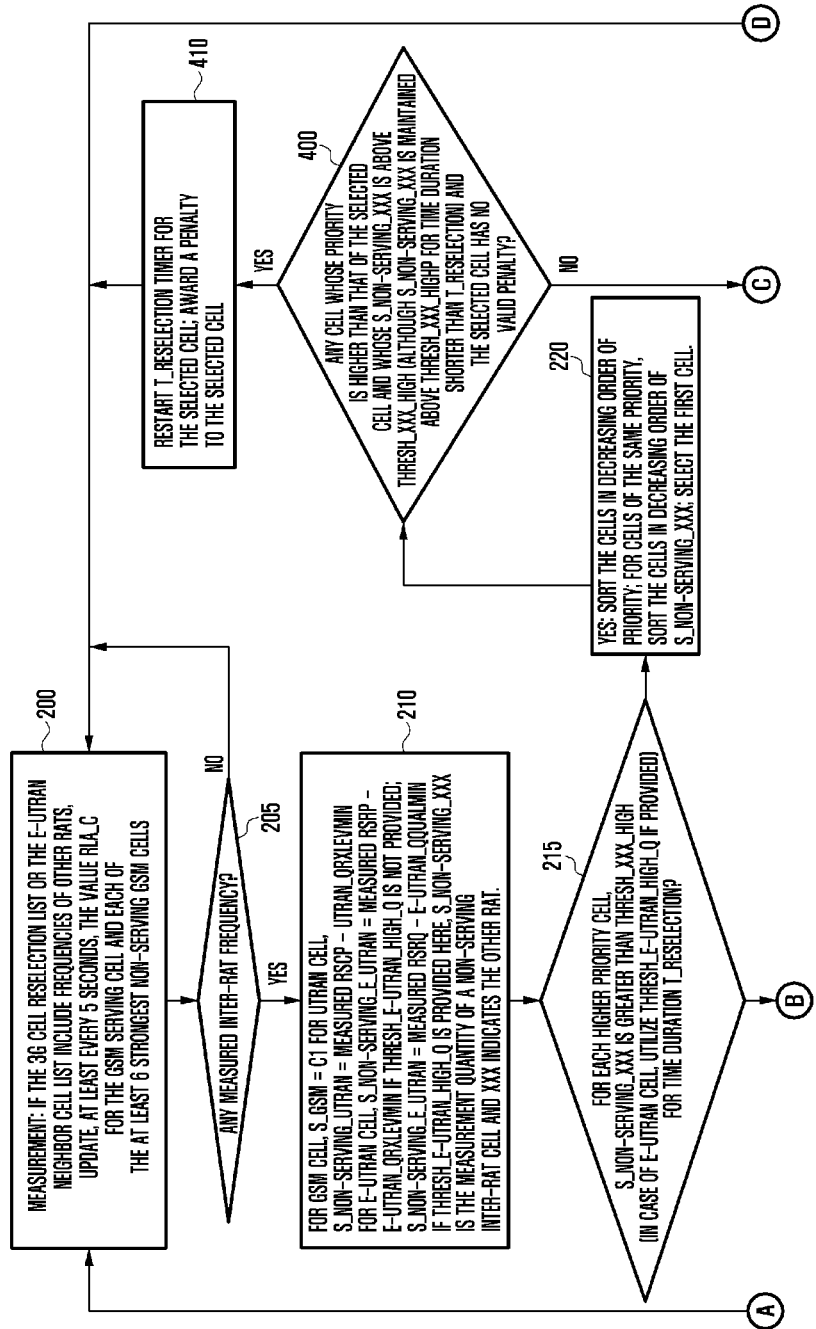
FIGS. 4A and 4B are flowcharts describing the enhanced algorithm for priority based cell reselection according to the first embodiment of the present disclosure.
Figure 4B:
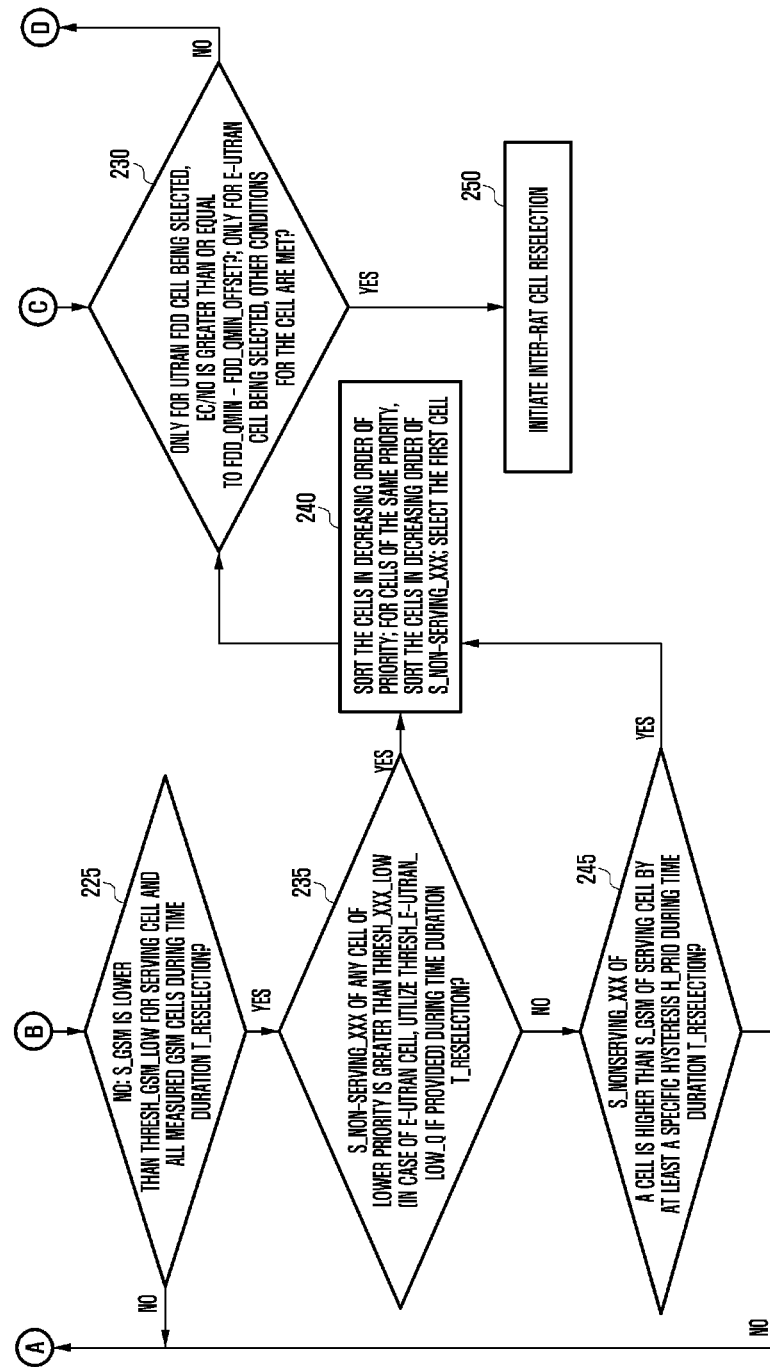

FIGS. 4A and 4B are flowcharts describing the enhanced algorithm for priority based cell reselection according to the first embodiment of the present disclosure.

Referring to FIGS. 4A and 4B, modifications made to the existing algorithm of FIG. 2 are represented in operations 400 and 410. After the first cell is selected at operation 220, at operation 400, the UE checks whether an inter-RAT cell whose priority is higher than that of the selected cell and whose S_non-serving_XXX is above THRESH_XXX_high (although S_non-serving_XXX is maintained above THRESH_XXX_high for a time duration shorter than T_Reselection) is present and the selected cell has no penalty. If the condition of operation 400 is not satisfied, the UE may initiate cell reselection after operation 230 by use of the selected cell. If the condition of operation 400 is satisfied, at operation 410, the UE restarts the time of T_Reselection for the selected cell and awards a penalty to the selected cell. After operation 410, the procedure returns to operation 200 at which the UE continues measurement. When T_Reselection for a high priority cell expires, the UE may initiate cell reselection using a higher priority cell.

The penalty awarded to the selected cell at operation 410 is to prevent indefinite delay of inter-RAT cell reselection due to attempts made to select the highest priority cell. A penalty is awarded to a cell that has been selected once and whose T_Reselection time is extended owing to presence of a higher priority cell. When a cell having a penalty is re-selected according to the cell reselection criteria within a given time duration after penalty awarding, the enhanced algorithm for finding a higher priority cell is not applied. In this case, the UE initiates inter-RAT cell reselection using the reselected cell although a higher priority cell is present. The penalty awarded to a selected cell is removed after a given time expires. When the selected cell is re-selected after penalty removal, the enhanced algorithm for finding a higher priority cell may be applied.

FIG. 4C is a flowchart describing the difference between the existing algorithm and the enhanced algorithm according to the first embodiment of the present disclosure.

Referring to FIG. 4C, at operation 450, the first cell is selected (operation 220 of FIG. 4A). At operation 455, the UE checks whether the signal strength of a cell having a higher priority than the selected cell is above the corresponding threshold (THRESH_XXX_high). Thresholds for cells are described at operation 215 of FIG. 2A. If the condition of operation 455 is not satisfied, at operation 470, the UE initiates inter-RAT cell reselection using the selected cell. If the condition of operation 455 is satisfied, at operation 460, the UE checks whether the selected cell (selected at operation 220) has been awarded a penalty. If the selected cell has not been awarded a penalty, at operation 465, the UE restarts the T_Reselection timer for the selected cell and awards a penalty to the selected cell. If the selected cell has been awarded a penalty, at operation 470, the UE initiates inter-RAT cell reselection using the selected cell.

FIG. 5 depicts the behavior of an enhanced algorithm for priority based cell reselection according to a second embodiment of the present disclosure.

Referring to FIG. 5, signal strengths of GSM serving cell 501, 3G neighbor cell 502, and 4G neighbor cell 503 are displayed with the passage of time. The signal strengths of the GSM serving cell, the 3G neighbor cell and the 4G neighbor cell are indicated by a solid line, broken line, and alternate long and short dash line, respectively. Here, it is assumed that the 4G communication network takes precedence over the 3G communication network.

Threshold 1 504 is associated with the GSM serving cell. When the signal strength of the GSM serving cell (GSM RxLev) becomes less than threshold 1 504, the UE may start to find a target cell for cell reselection. Threshold 2 505 is associated with a 4G neighbor cell. When the signal strength of a 4G neighbor cell (RSRP) becomes greater than threshold 2 505, the 4G neighbor cell may be recognized by the UE. Further, when the signal strength thereof is maintained above threshold 2 505 for a given duration, the 4G neighbor cell may become a candidate for cell reselection. Threshold 3 506 is associated with a 3G neighbor cell. When the signal strength of a 3G neighbor cell (RSCP) becomes greater than threshold 3 506, the 3G neighbor cell may be recognized by the UE. Further, when the signal strength thereof is maintained above threshold 3 506 for a given duration, the 3G neighbor cell may become a candidate for cell reselection. T_Reselection 507 is a reference time duration. When the signal strength of a neighbor cell is maintained above the corresponding threshold for a time duration T_Reselection, the UE may select the neighbor cell.

When the signal strength of the GSM serving cell becomes less than threshold 1 504, the UE starts to find a target cell for cell reselection at operation 500. When the signal strength of a 3G neighbor cell becomes greater than threshold 3 506, the UE recognizes the 3G neighbor cell and adds the 3G neighbor cell to a candidate list for cell reselection at operation 510. When the signal strength of a 4G neighbor cell becomes greater than threshold 2 505, the UE recognizes the 4G neighbor cell and adds the 4G neighbor cell to the candidate list for cell reselection at operation 520. Here, when the signal strength of the 3G neighbor cell is maintained above threshold 3 506 for a time duration T_Reselection, the UE checks presence of an inter-RAT cell whose priority is higher than that of the 3G neighbor cell and whose signal strength is above the corresponding threshold (the 4G neighbor cell satisfies this condition in FIG. 5) at operation 530. If the signal strength of an inter-RAT cell having a higher priority than the 3G neighbor cell is maintained above the corresponding threshold for a time duration T_Reselection_1, the UE re-selects the cell with a higher priority (4G neighbor cell) and initiates inter-RAT cell reselection using the cell with a higher priority at operation 540.

Figure 6A:
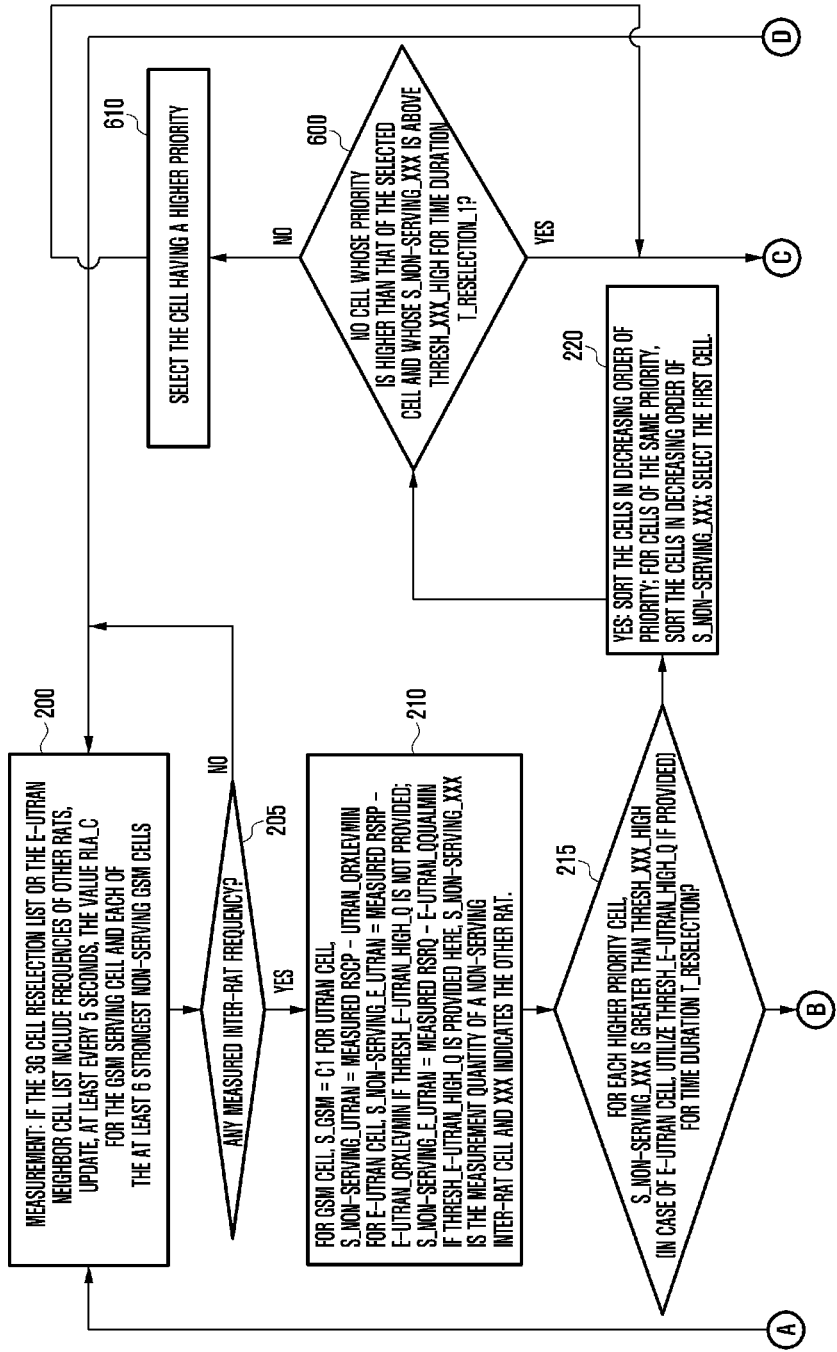
FIGS. 6A and 6B are flowcharts describing the enhanced algorithm for priority based cell reselection according to the second embodiment of the present disclosure.
Figure 6B:
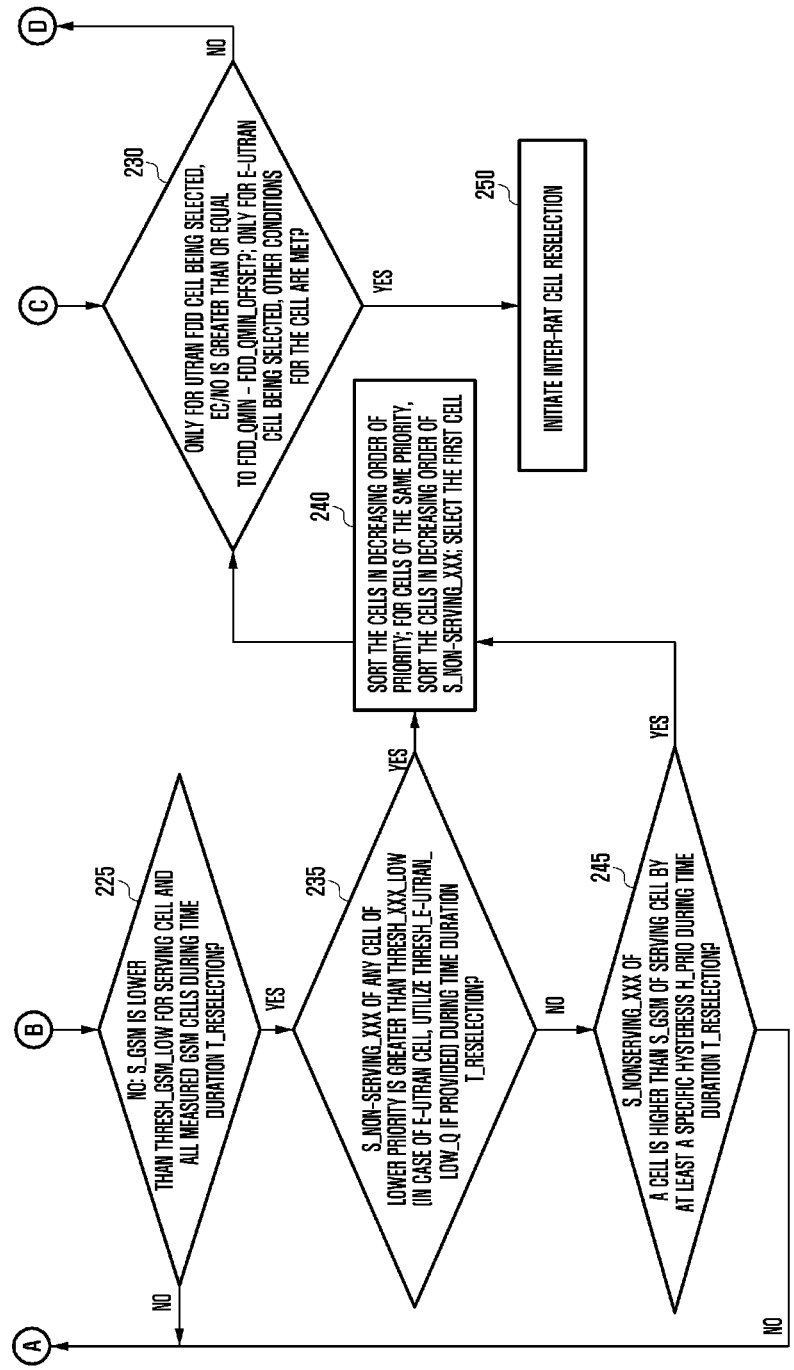

FIGS. 6A and 6B are flowcharts describing the enhanced algorithm for priority based cell reselection according to the second embodiment of the present disclosure.

Referring to FIGS. 6A and 6B, modifications made to the existing algorithm of FIG. 2 are represented in operations 600 and 610. After the first cell is selected at operation 220, at operation 600, the UE checks presence of an inter-RAT cell whose priority is higher than that of the selected cell and whose S_non-serving_XXX is above THRESH_XXX_high. If no such a cell is present, at operation 250, the UE may initiate cell reselection after operation 230 by use of the selected cell. If such a cell is present (i.e. a cell whose priority is higher than that of the selected cell and whose S_non-serving_XXX is maintained above THRESH_XXX_high for a time duration T_Reselection_1), at operation 610, the UE re-selects the cell with a higher priority. Thereafter, at operation 250, the UE may initiate cell reselection after operation 230 by use of the selected cell with a higher priority.

In the second embodiment of the present disclosure, unlike the first embodiment, the time of T_Reselection is not extended. In the second embodiment, the signal strength is to be maintained above the threshold for a time duration T_Reselection_1 shorter than the time duration T_Reselection, accelerating the procedure for inter-RAT cell reselection. Time values for T_Reselection_1 may be configured on a RAT basis or a cell basis. In the second embodiment, cell reselection is performed towards the highest priority inter-RAT cell satisfying the cell reselection criteria although the signal strength of the highest priority cell is maintained above the corresponding threshold for a time duration T_Reselection_1 shorter than the time duration T_Reselection.

Figure 6C:
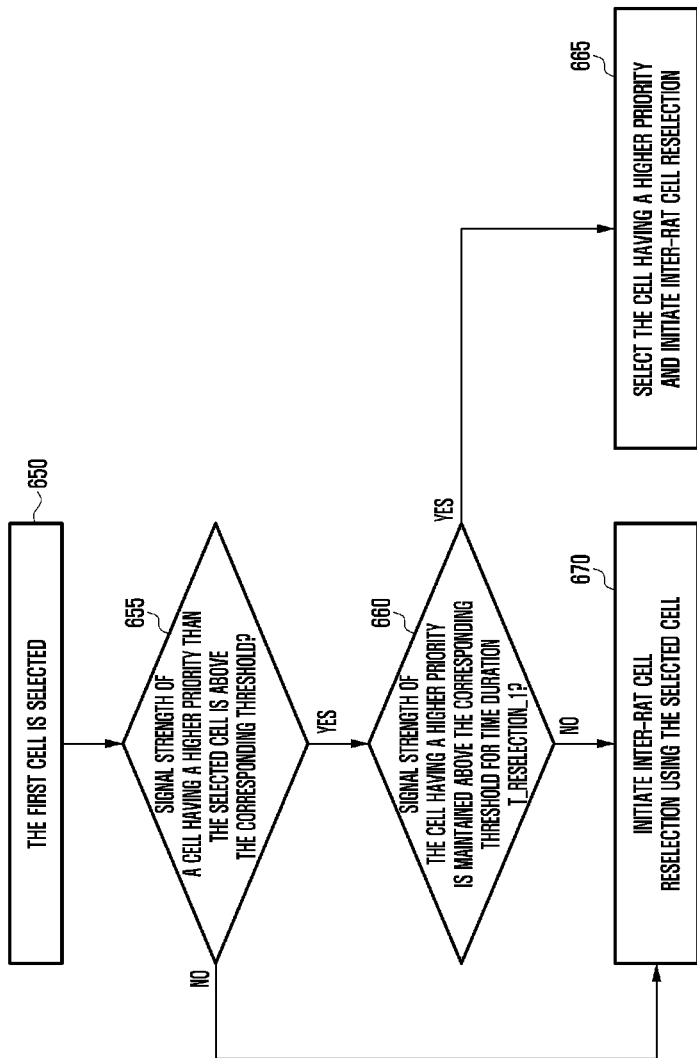
FIG. 6C is a flowchart describing the difference between the existing algorithm and the enhanced algorithm according to the second embodiment of the present disclosure.

FIG. 6C is a flowchart describing the difference between the existing algorithm and the enhanced algorithm according to the second embodiment of the present disclosure.

Referring to FIG. 6C, at operation 650, the first cell is selected (operation 220 of FIG. 6A). At operation 655, the UE checks whether the signal strength of a cell having a higher priority than the selected cell is above the corresponding threshold (THRESH_XXX_high). Thresholds for cells are described at operation 215 of FIG. 2A. If the condition of operation 655 is not satisfied, at operation 670, the UE initiates inter-RAT cell reselection using the selected cell. If the condition of operation 655 is satisfied, at operation 660, the UE checks whether the signal strength of the cell having a higher priority is maintained above the corresponding threshold for a time duration T_Reselection_1. If the condition of operation 660 is not satisfied, at operation 670, the UE initiates inter-RAT cell reselection using the selected cell. If the condition of operation 660 is satisfied, at operation 665, the UE selects the cell having a higher priority and initiates inter-RAT cell reselection using the selected cell having a higher priority. When the condition of operation 660 is satisfied by multiple cells, the UE initiates inter-RAT cell reselection using the highest priority cell among the multiple cells.

Figure 7:
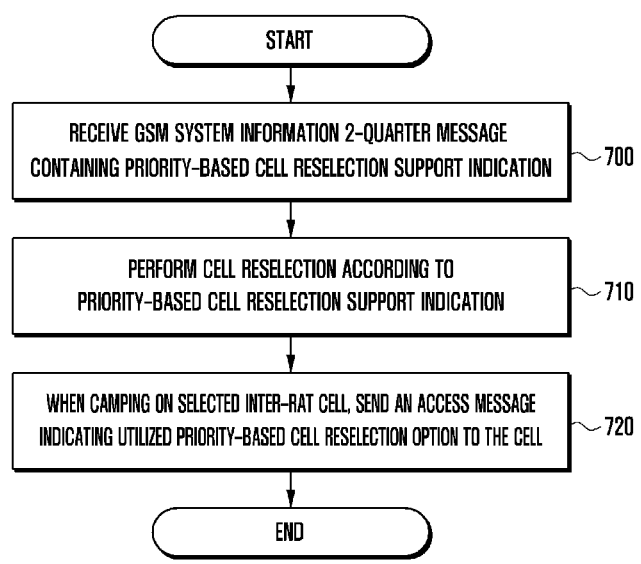
FIG. 7 is a flowchart describing utilization of the enhanced algorithm according to a third embodiment of the present disclosure.

FIG. 7 is a flowchart describing utilization of the enhanced algorithm according to a third embodiment of the present disclosure.

The third embodiment relates to a scheme to apply the enhanced algorithm for priority based inter-RAT cell reselection.

Referring to FIG. 7, a GSM cell may broadcast a GSM System Information 2-quarter message containing a priority-based cell reselection support indication to UEs. Here, the indication may be set to 0 (existing algorithm only), 1 (enhanced algorithm of embodiment 1), 2 (enhanced algorithm of embodiment 2). At operation 700, the UE receives a GSM system information 2-quarter message containing a priority-based cell reselection support indication from the GSM cell. At operation 710, the UE performs cell reselection by use of the existing algorithm or the enhanced algorithm according to the priority-based cell reselection support indication of the received system information. At operation 720, when camping on a selected cell, the UE sends an access message containing a priority-based cell reselection indication indicating the algorithm used for priority-based cell reselection.

Thereby, for cell planning, the access success rate may be computed for each priority-based cell reselection option used (existing algorithm, enhanced algorithm of embodiment 1, and enhanced algorithm of the second embodiment of the present disclosure). These access success rates may be used for priority-based cell reselection parameter tuning when inter-RAT cells are overlaid or overlap, or for other applications. For example, the access success rates may be used for adjustment of priorities between inter-RAT cells during cell planning in self-organizing networks (SONs).

Figure 8:
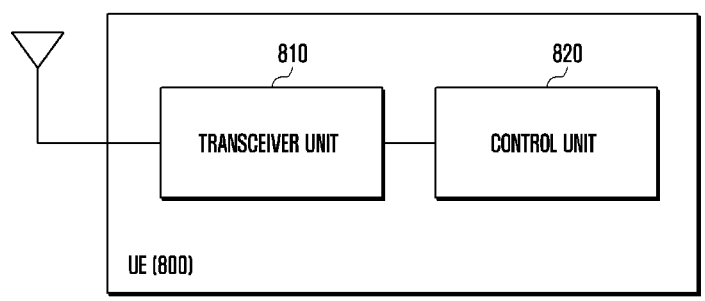
FIG. 8 is a block diagram of a user equipment according to an embodiment of the present disclosure.

FIG. 8 is a block diagram of a user equipment according to an embodiment of the present disclosure.

Referring to FIG. 8, the UE 800 may include a transceiver unit 810 and a control unit 820. The transceiver unit may send and receive signals. The control unit may control to measure the strength of a received signal. The control unit may also control a process of checking, when the signal strength of the serving cell becomes less than a preset threshold of the RAT associated with the serving cell, presence of a candidate cell whose signal strength is greater than a preset threshold of the RAT associated with the candidate cell (first condition) for a time duration T_Reselection, selecting the highest priority cell as the first cell among candidate cells satisfying the first condition for a time duration T_Reselection, and checking, after selecting the first cell, presence of a second cell whose priority is higher than that of the first cell and whose signal strength is greater than a preset threshold of the RAT associated with the second cell.

If the second cell is present, the control unit may control a process of checking whether the first cell has a valid penalty, initiating, when the first cell has a valid penalty, cell reselection by use of the first cell, and restarting, when the first cell does not have a valid penalty, the T_Reselection timer for the first cell. Alternatively, the control unit may control a process of checking whether the signal strength of the second cell is maintained above a preset threshold of the RAT associated with the second cell for a time duration T_Reselection_1, and selecting, when the signal strength of the second cell is maintained above the preset threshold of the associated RAT for the time duration T_Reselection_1, the second cell and initiating cell reselection by use of the second cell.

The control unit may control to receive system information containing priority information of each cell. When multiple second cells satisfying the first condition for the time duration T_Reselection_1 are present, the control unit may control a process of selecting the highest priority cell among the second cells and initiating cell reselection by use of the highest priority cell. The control unit may control to receive system information containing an indication to a priority-based cell reselection option. The control unit may control to send an access message containing an indication to the priority-based cell reselection option used for cell reselection to the selected cell.

In a feature of the present disclosure, the enhanced cell reselection method selects a cell having the highest priority among cells whose signal strength is above a preset threshold. Hence, it is possible to prevent repetition of unnecessary cell reselection.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for performing priority based inter-radio access technology (inter-RAT) cell reselection by a user equipment in a wireless communication system, the method comprising:
    checking, when signal strength of a serving cell becomes less than a preset threshold of a radio access technology (RAT) associated with the serving cell, presence of a candidate cell meeting a first condition, the first condition being a condition where signal strength of the candidate cell is greater than a preset threshold of a RAT associated with the candidate cell for a time duration for cell reselection;
    selecting a highest priority cell as a first cell among candidate cells satisfying the first condition for the time duration;
    checking, after selecting the first cell, presence of a second cell whose priority is higher than that of the first cell and whose signal strength is greater than a preset threshold of a RAT associated with the second cell; and
    changing, when the second cell is present, a first time duration for cell reselection associated with the first cell or a second time duration for cell reselection associated with the second cell to perform a cell reselection.

2. The method of claim 1, further comprising receiving system information containing priority information of each cell.

3. The method of claim 1, wherein the changing of the first time duration or the second time duration comprises:

checking, when the second cell is present, whether the first time duration associated with the first cell has been extended owing to a presence of the second cell; and initiating, when the second cell is present and the first time duration associated with the first cell has been extended, the cell reselection by use of the first cell.

4. The method of claim 3, wherein, when the second cell is present and the first time duration has not been extended, extending the first time duration.

5. The method of claim 3, further comprising receiving system information containing an indication to a priority-based cell reselection option.

6. The method of claim 3, further comprising sending an access message containing an indication to the priority-based cell reselection option used for cell reselection to the selected cell.

7. The method of claim 1, wherein the changing of the first time duration or the second time duration comprises:
checking, when the second cell is present, whether the signal strength of the second cell is maintained above the preset threshold of the RAT associated with the second cell for the second time duration;
selecting, when the signal strength of the second cell is maintained above the preset threshold of the RAT associated with the second cell for the second time duration, the second cell; and
initiating the cell reselection by use of the second cell.

8. The method of claim 7, wherein the second time duration is shorter than the first time duration.

9. The method of claim 1, wherein the changing of the first time duration or the second time duration comprises:
selecting, when multiple second cells satisfying the first condition for the second time duration are present, the highest priority cell among the second cells; and
initiating the cell reselection by use of the highest priority cell.

10. The method of claim 7, further comprising receiving system information containing an indication to a priority-based cell reselection option.

11. The method of claim 7, further comprising sending an access message containing an indication to the priority-based cell reselection option used for cell reselection to the selected cell.

12. A user equipment capable of performing priority based inter-radio access technology (inter-RAT) cell reselection in a wireless communication system, the user equipment comprising:
a transceiver configured to send and receive signals; and
at least one processor configured to:
check, when signal strength of a serving cell becomes less than a preset threshold of a radio access technology (RAT) associated with the serving cell, presence of a candidate cell meeting a first condition, the first condition being a condition where signal strength of the candidate cell is greater than a preset threshold of a RAT associated with the candidate cell for a time duration for cell reselection,
select a highest priority cell as a first cell among candidate cells satisfying the first condition for the time duration,
check, after selecting the first cell, presence of a second cell whose priority is higher than that of the first cell and whose signal strength is greater than a preset threshold of a RAT associated with the second cell, and
change, when the second cell is present, a first time duration for cell reselection associated with the first cell or a second time duration for cell reselection associated with the second cell to perform a cell reselection.

13. The user equipment of claim 12, wherein the at least one processor is further configured to receive system information containing priority information of each cell.

14. The user equipment of claim 12, wherein, when the second cell is present, the at least one processor is further configured to:
check whether the first time duration associated with the first cell has been extended owing to a presence of the second cell, and
initiate, when the first time duration associated with the first cell has been extended, the cell reselection by use of the first cell.

15. The user equipment of claim 14, wherein, when the second cell is present and the first time duration has not been extended, the at least one processor is further configured to extend the first time duration.

16. The user equipment of claim 14, wherein the at least one processor is further configured to receive system information containing an indication to a priority-based cell reselection option.

17. The user equipment of claim 14, wherein the at least one processor is further configured to send an access message containing an indication to the priority-based cell reselection option used for cell reselection to the selected cell.

18. The user equipment of claim 12, wherein the at least one processor is further configured to:
check whether the signal strength of the second cell is maintained above the preset threshold of the RAT associated with the second cell for the second time duration,
select, when the signal strength of the second cell is maintained above the preset threshold of the associated RAT for the second time duration, the second cell, and
initiate the cell reselection by use of the second cell.

19. The user equipment of claim 18, wherein the second time duration is shorter than the first time duration.

20. The user equipment of claim 12, wherein, when multiple second cells satisfying the first condition for the second time duration are present, the at least one processor is further configured to control a process of selecting the highest priority cell among the second cells and initiating the cell reselection by use of the highest priority cell.

21. The user equipment of claim 18, wherein the at least one processor is further configured to control to receive system information containing an indication to a priority-based cell reselection option.

22. The user equipment of claim 18, wherein the at least one processor is further configured to control to send an access message containing an indication to the priority-based cell reselection option used for cell reselection to the selected cell.

* * * * *